US012734556B2

(12) United States Patent
Pratt

(10) Patent No.: US 12,734,556 B2
(45) Date of Patent: *Sep. 15, 2026

(54) ERGONOMIC HANDLE SCRAPER

(71) Applicant: Nathan Glover Pratt, Guthrie, OK (US)

(72) Inventor: Nathan Glover Pratt, Guthrie, OK (US)

(*) Notice: Subject to any disclaimer, the term of this patent is extended or adjusted under 35 U.S.C. 154(b) by 388 days.

This patent is subject to a terminal disclaimer.

(21) Appl. No.: 18/050,984

(22) Filed: Oct. 29, 2022

(65) Prior Publication Data

US 2023/0085512 A1 Mar. 16, 2023

Related U.S. Application Data

(63) Continuation of application No. 16/559,466, filed on Sep. 3, 2019, now Pat. No. 11,529,654.

(60) Provisional application No. 62/726,331, filed on Sep. 3, 2018.

(51) Int. Cl.

| | |
|---|---|
| ***A46B 5/02*** | (2006.01) |
| ***A46B 17/02*** | (2006.01) |
| ***A47L 13/022*** | (2006.01) |
| ***A47L 13/08*** | (2006.01) |
| ***B08B 1/16*** | (2024.01) |
| ***B25G 1/10*** | (2006.01) |
| ***G08B 1/00*** | (2006.01) |

(52) U.S. Cl.

CPC .............. *B08B 1/165* (2024.01); *A46B 5/021* (2013.01); *A46B 17/02* (2013.01); *A47L 13/022* (2013.01); *A47L 13/08* (2013.01); *B25G 1/102* (2013.01); *A46B 2200/1066* (2013.01); *A47G 2200/046* (2013.01)

(58) Field of Classification Search

CPC ........... A46B 5/021; A46B 5/025; A46B 5/02; A46B 2200/046; B24D 15/023; B24D 15/04; B60S 3/045; A47L 13/022; B25G 1/102; A47G 2200/046; B23D 71/04; B08B 1/165

USPC ........................................ D7/653, 664, 401.2

See application file for complete search history.

(56) References Cited

U.S. PATENT DOCUMENTS

| | | | | | |
|---|---|---|---|---|---|
| 2,441,268 A * | 5/1948 | Haber | A47L 13/022 15/229.13 |
| 5,075,975 A * | 12/1991 | Wilson | A47G 21/02 30/322 |
| 5,588,651 A * | 12/1996 | Frost | A63B 60/00 473/206 |
| D441,601 S * | 5/2001 | Taylor | D7/401.2 |

(Continued)

*Primary Examiner* — Daniel J Colilla

(74) *Attorney, Agent, or Firm* — Martin S. High, P.C.

(57) ABSTRACT

The Ergonomic Handle Scraper includes an ergonomic handle device that may be adapted to perform a wide variety of tasks such as scrubbing, scraping, scooping, cutting, brushing, painting, sanding, grating, shaving, etc. The device may be produced in a wide variety of shapes and sizes and may be constructed from a wide variety of materials and manufacturing processes. The Ergonomic Handle Scraper provides a user with a compact, ergonomic handle which may be used in conjunction with other adjoining and complementary shapes, materials, surfaces, textures or tools. More specifically, the ergonomic handle is the basic component that enables other components to be combined with or extended from the handle.

2 Claims, 25 Drawing Sheets

(56) References Cited

U.S. PATENT DOCUMENTS

| | | | | |
|---|---|---|---|---|
| 2007/0062006 | A1* | 3/2007 | Wright | B25F 5/02 16/430 |
| 2018/0310740 | A1* | 11/2018 | Duffey | A47G 21/04 |
| 2020/0368922 | A1* | 11/2020 | Holmes | B25J 15/08 |

* cited by examiner

ERGONOMIC HANDLE SCRAPER

BACKGROUND OF THE EMBODIMENTS

Field of the Embodiments

In general, the present embodiments relate to a handheld ergonomic device. The present embodiments may be adapted to accomplish a variety of tasks, including scrubbing, scraping, scooping, brushing, painting, marking, drawing, cutting, sanding, grating, shaving, among many other tasks. More particularly, the present embodiments feature an ergonomic handle that may be used in conjunction with other adjoining and complementary shapes, materials, surfaces, textures or tools.

Description of Prior Art

Many consumer products incorporate a handle that enables a user to grasp, hold and manipulate the product. Different products feature different types of handles. Some handles are long and slender, while other handles may be short, round and similar in shape to a knob. Several factors contribute to the effectiveness of a handle. For example, a handle can perform effectively if it has sufficient strength to support the weight and various stresses that may be exerted upon the handle and the rest of the device. In addition, a handle must have sufficient length and overall surface area so that a user may grasp, hold and manipulate the device.

Not all handheld consumer objects have handles. Some objects, such as flat, foam scrubbing pads, do not have a specific handle, but rather the user must grasp the pad itself and maintain a grip on the pad without the use of a handle. Often the user must place their thumb on one side of the pad, while placing their other digits on the opposite side of the pad. This particular placement of thumb and other digits enables a user to squeeze the pad between the thumb and opposing digits. Further, the user often squeezes the pad into a shape that conforms to the shape that exists between the user's thumb and other digits. In this instance, the user has effectively created a type of handle by simply squeezing the pad into a shape that conforms to the natural contours that exist between the thumb and opposing digits.

The design of the handle is often dictated by the type of task that must be performed with the handle. Ergonomically designed handles contribute to the effectiveness of the handle and the object to which the handle is attached. In general, ergonomics is a science that is concerned with designing consumer products in a manner that makes the products easier and safer to use. A common ergonomic strategy involves the creation of various curved surfaces that are designed to correspond to the curved surfaces and mechanics of the human hand. Some products have handles that exhibit few ergonomic qualities, which results in a product that may be considered awkward, uncomfortable and somewhat ineffective or inefficient. Other products that exhibit greater ergonomic features are often considered more comfortable and effective.

Many handles employ a cylindrical design that includes a somewhat round or oval circumference. For example, paintbrushes often have long, slender, somewhat cylindrical handles. The long handle enables a user to wrap multiple digits around the handle. Paintbrushes, toothbrushes, hairbrushes, various kitchen utensils and shaving razors each have similar long, cylindrical, slender handles. Some scrub brushes have long handles, while others have short, knob-like handles. Short, knob-like handles are sometimes designed to enable a user to wrap their digits around the handle while placing their palm over the top of the knob-like handle. Placing the palm over the top of the knob-like handle enables a user to exert greater force upon the knob.

Many common products with long handles may be improved by employing a handle with a more compact, ergonomic design. Some common handles are unnecessarily bulky, cumbersome and lacking in versatility or ergonomic appeal. In some cases, a long handle may inhibit the user's ability to exert greater precision while using the device. A user is often able to exert more precise control over an object if the hand is closer to the surface upon which the product is making contact. A long handle may create distance between the user's hand and the end portion of the device which is performing a task such as painting, scrubbing or shaving. Thus, a shorter, more compact, ergonomic handle may offer a user greater control and precision over the product that is being manipulated. Some activities such as painting, scrubbing or shaving require greater precision, dexterity and control by the human hand.

In many cases, the user often holds the handle in a manner that enables their hand to be near the working surface. For example, when a user is shaving, the user exercises great care while manipulating the handle that is attached to the razor. In this instance, the user does not instinctively grasp the portion of the handle that is furthest away from the blade. Instead, the user grasps the portion of the handle that is closer to the blade. Grasping the portion of the handle that is closer to the blade gives the user a greater sense of confidence that they will not accidentally cut themselves with the blade.

A pencil may be used to further illustrate this ergonomic principle. When writing with a pencil, the user grasps the pencil near the writing portion of the pencil, which enables the user to rest or stabilize their hand on the writing surface. This stabilizing posture allows the user to exercise greater control over the pencil and writing activity. Conversely, if a pencil user attempts to write by grasping the eraser end of the pencil without resting their hand on a stabilizing surface, the writing activity becomes substantially more difficult.

A compact, ergonomic handle may enable a user to rest their hand on a stabilizing surface while still manipulating the handle of the product. This posture is made possible by the short distance between the handle and the surface that is being contacted by the end of the product. Conversely, a long handle creates a greater distance between the hand and the end of the product that the user is manipulating. This greater distance sometimes prevents the user from stabilizing their hand on the surface that is being worked upon. In some cases, this greater distance prevents the user from achieving maximum comfort, control and precision with the product. Thus, the need exists for a product with an ergonomic handle that enables a user to stabilize their hand on a working surface while simultaneously manipulating the handle with that same hand.

The overall shape of the human hand may be described as a rather flat series of structures. In the resting position, the bones of the palm, fingers and thumb are generally structured in the same directional alignment within the same geometric plane. In some cases, it may be beneficial to utilize a handle that more closely matches the resting shape and structure of the human hand. Yet most long, slender, cylindrical handles require the user to bend and curl their thumb and digits around the circumference of the handle.

Similarly, short, round, knob-like handles also require the user to wrap or curl their thumb and digits around the handle. Long, slender handles and short, knob-like handles require the user to squeeze and maintain pressure around the handle. Many of these types of handles require the user to clench their hand, which can be an uncomfortable and even painful activity for some users. Some users with arthritis may find it difficult to curl or wrap their digits around a long handle or a short, knob-like handle. Many users may find it beneficial to grasp an object without being required to substantially bend, curl or wrap their digits around the cylindrical circumference of a common handle. Thus, the need exists for a compact, ergonomic handle that features a broader, yet contoured surface which corresponds to the shape and structure of the human hand at rest. Further, the need exists for an ergonomic handle that enables a user to exert minimal effort when grasping and manipulating the device.

Some tasks require a long handle because the long handle provides the leverage that is necessary to complete the task. In other cases, a long handle may provide the necessary reach or safe distance that is required between the user's hand and the surface that is being contacted. However, some products employ handles that may be unnecessarily long. A more compact, comfortable, ergonomic handle requires less leverage and force that is often required by products with longer handles. Some tasks may be performed more precisely and more efficiently by products that employ a more compact, ergonomic handle. Therefore, the need exists for a compact, ergonomic handle that does not require a user to wrap or curl their thumb and fingers around the circumference of a generally cylindrical, long handle.

Sometimes a long handle may interfere with other objects in the surrounding area. Products with longer handles occupy more space in packaging, on store shelves and in shipping containers. All these factors contribute to a more expensive product. Another shortcoming of long or bulky handles is their inconvenience in portable use. Longer handles also increase the overall weight of a product, thereby adding material cost which creates a higher price point that the consumer is forced to pay. Most handles are designed to be held in one basic position. As a result, many handles restrict the user by limiting the number of ways in which the handle can be gripped and manipulated. Most handles lack a variety of ergonomic options for grasping and manipulating the product. Often, consumers encounter spontaneous circumstances that require product versatility. Therefore, a need exists for a versatile handle that is portable, small, easily usable and affordable. Further, a need exists for a compact ergonomic handle that offers multiple ergonomic options for manipulating a product.

The above discussion is not to be considered exhaustive, however, does demonstrate that a need exists for allowing individuals to efficiently and effectively use compact, ergonomic handle devices. The consuming public is looking for solutions to address these needs and there is an obvious need to fill the gap where the prior art has failed. What is needed is an adaptive device to address these shortcomings in the prior art.

SUMMARY OF THE EMBODIMENTS

The present embodiments essentially provide a user with a compact, ergonomic handle which may be used in conjunction with other adjoining and complementary shapes, materials, surfaces, textures or tools. More specifically, the ergonomic handle is the basic component that enables other components to be combined with the ergonomic handle or extended from the ergonomic handle. Further, the ergonomic handle is a platform upon which other elements may be implemented. The versatility of the handle and its connected platform allows the handle to be applied to a wide variety of consumer products. The embodiments allow the operator greater comfort, effectiveness and greater portability.

The present embodiments provide a handheld ergonomic handle device comprising a frame having a primary gripping portion that includes a convex portion and a concave portion. In one embodiment, the overall frame of the device includes an underside cavity, a front-end portion, a topside left surface, a topside right surface and a topside front surface, an underside left surface, an underside right surface, an underside front surface, a perimeter edge surface, a front left corner and a front right corner. In another embodiment, the overall frame of the device includes an underside cavity, a front-end portion, a topside left surface, a topside right surface and a topside front surface, an underside left surface, an underside right surface, an underside front surface, a perimeter edge surface. Other embodiments include other combinations of these elements.

The device may be constructed from plastic, polymer, rubber, metal, recycled materials, natural fibers, organic material, wood, etc. The device may be manufactured from a variety of processes, including plastic injection molding, vacuum forming, stamping, pressing, stamping, casting, machining, etc. The device may be constructed from one material or a combination of materials. The device may be rigid, soft or flexible in nature. The device may be constructed from a combination of materials that provide it with both rigid and flexible qualities. The device may be constructed from certain materials that enable it to be folded. For example, the device may be constructed from natural fibers or paper-like substances that enable the device to be bent, folded or creased.

The embodiments may be adapted to perform many diverse tasks. For example, the compact, ergonomic handle may be adapted to perform scrubbing, scraping and cleaning activities. The ergonomic curvature of the handle inherently offers multiple surface areas that may be utilized for various scrubbing, scraping and cleaning activities. These surface areas may be utilized to interact with the surfaces of other objects such as dishes, plates, pots and pans.

Most scrubbing devices utilize bristles, brushes or spongy, absorbent materials that can be squeezed and flexed, thereby conforming to various contoured surfaces. Many of these devices are porous and absorbent, thereby causing the retention of water, moisture, food particles or other debris. Bristles and porous, absorbent materials can create environments where water, moisture and debris particles may linger, which creates an environment that may propagate germs and bacteria. Therefore, a need exists for a three-dimensional, ergonomic, contoured device that can scrub, scrape, scour, scoop and squeegee, yet accomplishes these tasks without bristles or some other absorbent, porous surface. However, the embodiments do not require materials that absorb and retain moisture and other particles.

Some dish cleaning devices are flat in shape. Some of these devices are similar to a flat scraping tool or flat squeegee device whose primary shape is constructed in a single flat plane. They come in square, rectangular, circular, oval, geometric or other irregular shapes. These flat objects often have flat edges and sometimes rounded corners that are designed to allow the user to scrape the surface of a dish. However, these flat objects are limited in their ability to quickly and efficiently clean, scrape or scrub the complex curves and contours of different types of dishes, bowls, forks, spoons, spatulas or other various cleaning utensils. These devices are limited due to the singular plane in which the device is constructed. These devices lack three-dimensionally curved surfaces that would enable the device to more efficiently and effectively reach all the curves and corners of a plate, dish, utensil or other curved object. Therefore, a need exists for an ergonomic handle scrubbing device that employs three dimensional contours.

There has thus been outlined, rather broadly, the more important features of the embodiments in order that the detailed description thereof that follows may be better understood and in order that the present contribution to the art may be better appreciated. There are, of course, additional features of the embodiment that will be described hereinafter and which will form the subject matter of the claims appended hereto.

In this respect, before explaining at least one embodiment of the embodiment in detail, it is to be understood that the embodiments are not limited in this application to the details of construction, arrangement of the components, systems, ranges and amounts thereof set forth in the following description. The embodiments are capable of other embodiments and of being practiced and carried out in various ways. Also, it is to be understood that the phraseology and terminology employed herein are for the purpose of description and should not be regarded as limiting. As such, those skilled in the art will appreciate that the conception upon which this disclosure is based may readily be utilized as a basis for the designing of other apparatus, compositions, methods, and systems for carrying out the several purposes of the present embodiments. It is important, therefore, that the claims be regarded as including such equivalent constructions insofar as they do not depart from the spirit and scope of the embodiments and drawings.

Further, the purpose of the foregoing abstract is to enable the U.S. Patent and Trademark Office and the public generally, and especially the practitioner in the art who are not familiar with patent or legal terms or phraseology, to determine quickly from a cursory inspection the nature and essence of the technical disclosure of the application. The abstract is neither intended to define the complete scope of the embodiments, which is measured by the claims, nor is it intended to be limiting as to the scope of the embodiments in any way.

Therefore, it is an object of the embodiments to provide a new and improved compact, ergonomic handle device that may allow greater comfort and stability during use by especially persons having a lesser degree of dexterity with their fingers and thumbs.

It is a further object of the embodiments to provide a new and improved versatile handle device that may also be customizable or adaptive in nature, whereby the handle may be used in conjunction with various attachments, other adjoining and complementary shapes, materials, surfaces, textures or tools.

It is another object of the embodiments to provide a new and improved compact, ergonomic handle device that may also be customizable regarding its size or scale relative to the objects or surfaces with which it may be interacting.

An even further object of the embodiments is to provide a new and improved compact, ergonomic handle device with a lower cost of manufacture and implementation, and, thus accordingly, has a lower price of sale or use to the consuming public thereby making such economically available.

Still another object of the embodiments is to provide a new and improved compact, ergonomic handle device, which provides all the advantages of the prior art, while simultaneously overcoming some of the disadvantages normally associated therewith.

These, together with other objects of the embodiments, along with the various features of novelty that characterize the embodiments, are pointed out with particularity in the claims annexed to and forming a part of this disclosure. For a better understanding of the embodiments, the operating advantages, and the specific objects attained by its uses, reference should be had to the accompanying descriptive matter in which there are illustrated preferred embodiments.

DETAILED DESCRIPTION OF THE PREFERRED EMBODIMENTS

Figure 1:
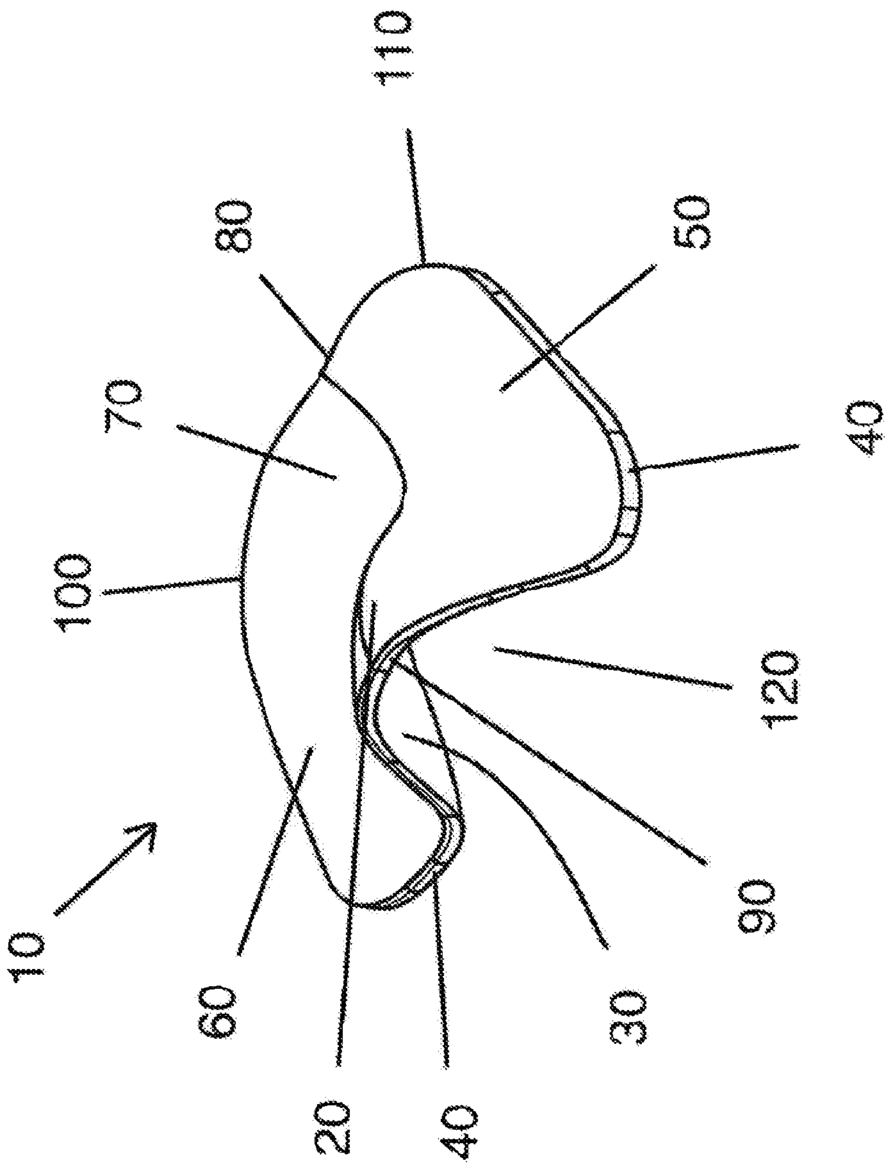
FIG. 1 is a top view illustration of an embodiment of the Ergonomic Handle Scraper.
Figure 2:
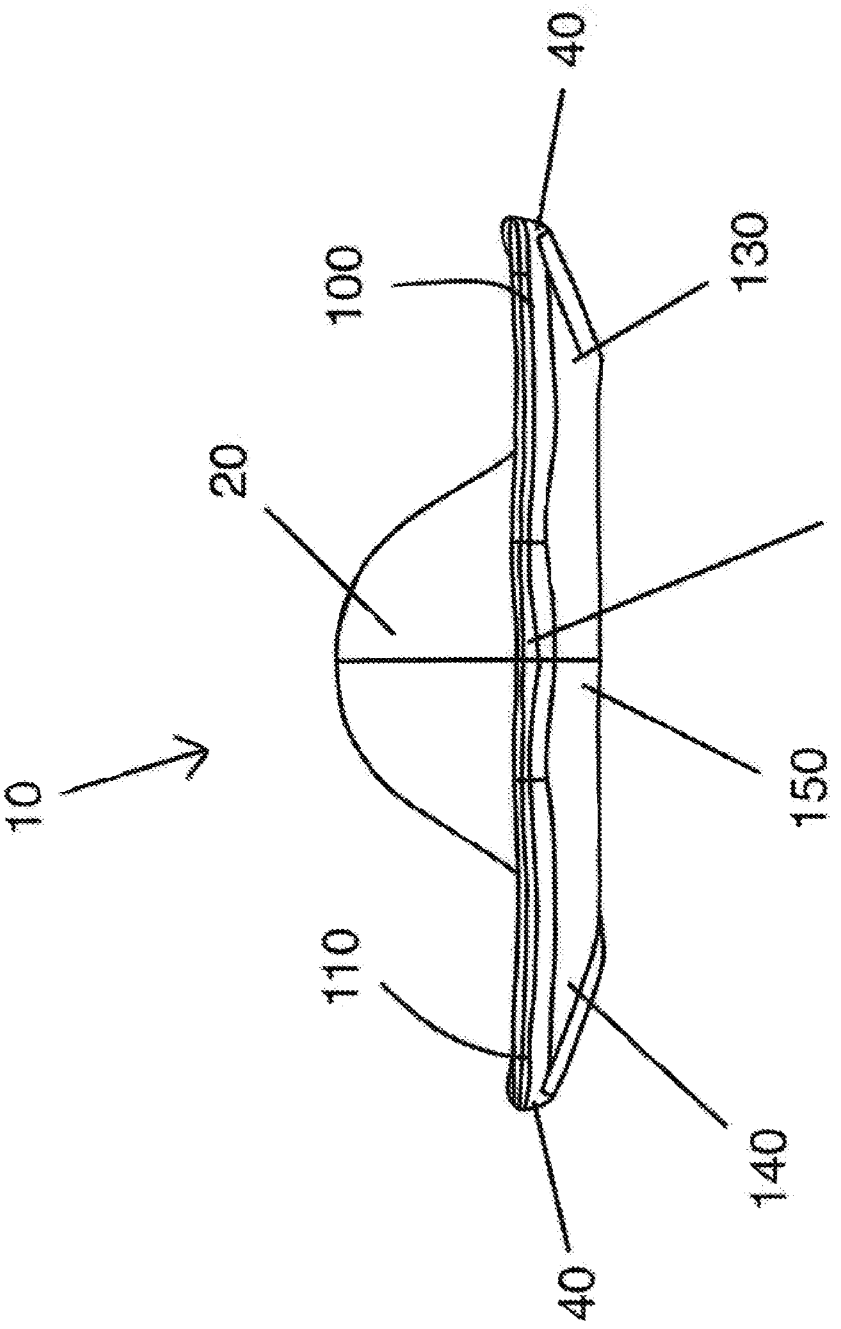
FIG. 2 is an end view illustration of an embodiment of the Ergonomic Handle Scraper.
Figure 3:
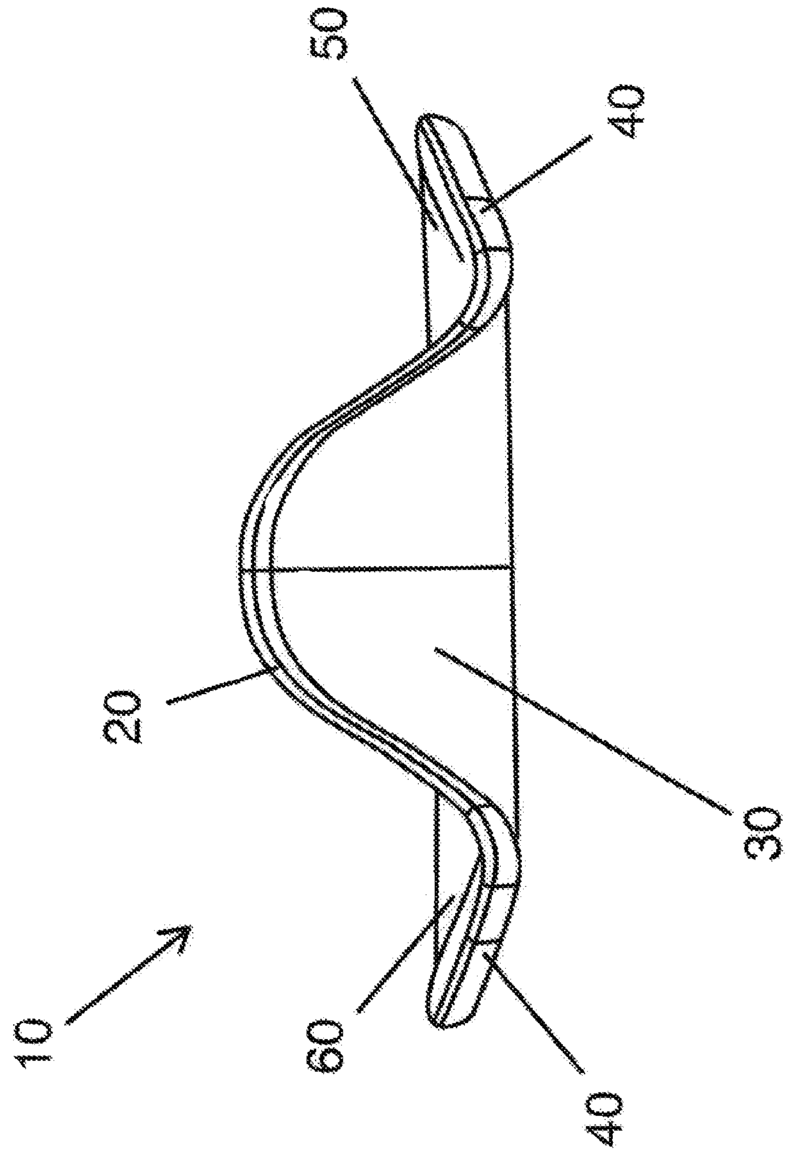
FIG. 3 is an end view illustration of an embodiment of the Ergonomic Handle Scraper.
Figure 4:
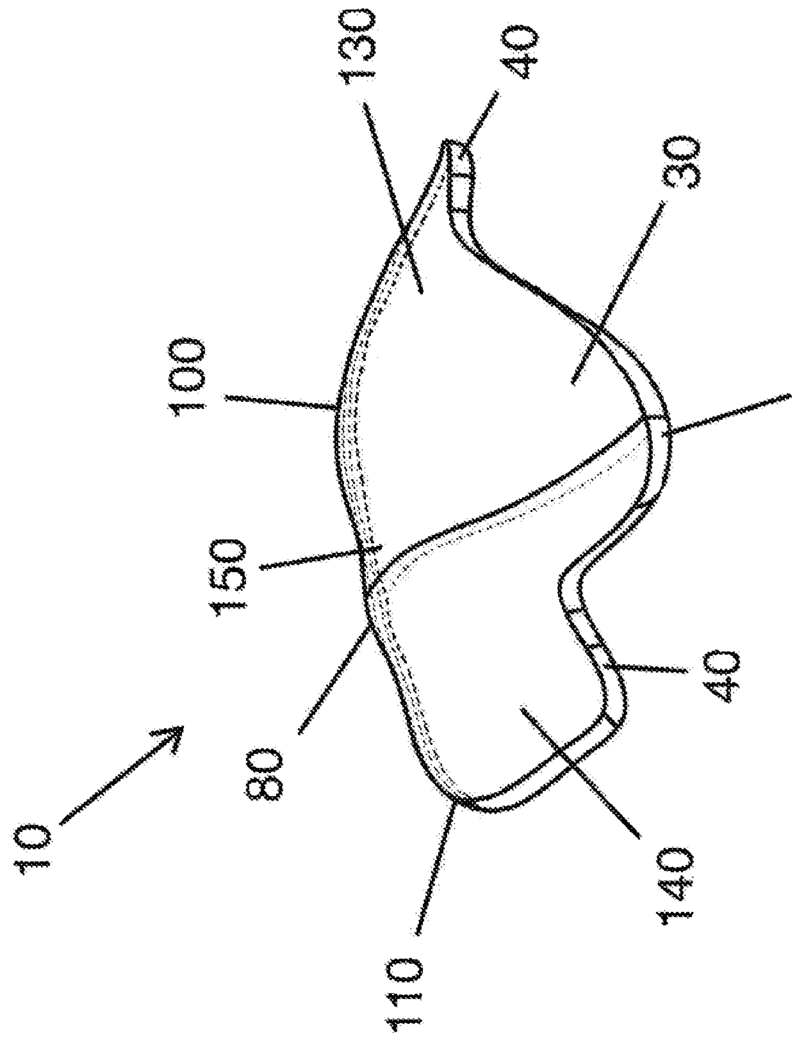
FIG. 4 is an underside view illustration of an embodiment of the Ergonomic Handle Scraper.
Figure 5:
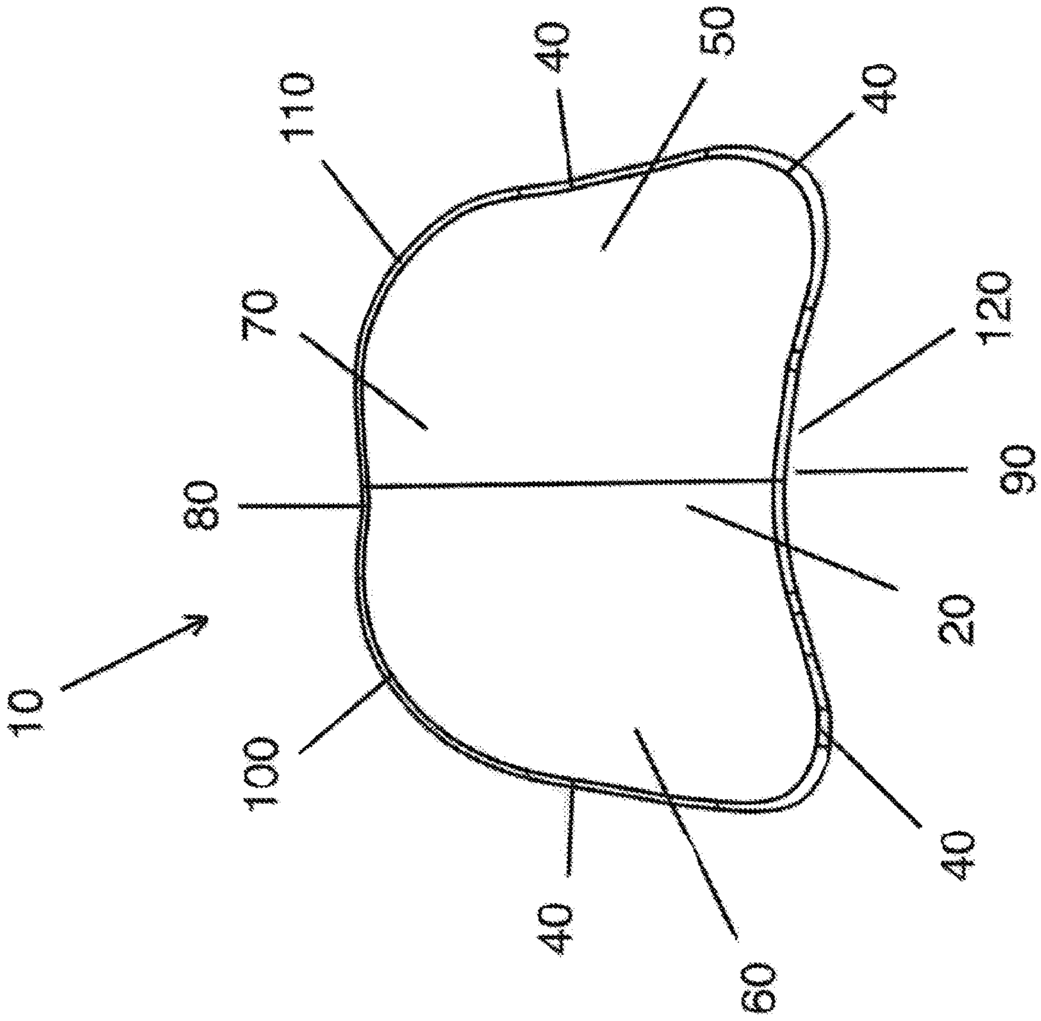
FIG. 5 is a top view illustration of an embodiment of the Ergonomic Handle Scraper.
Figure 6:
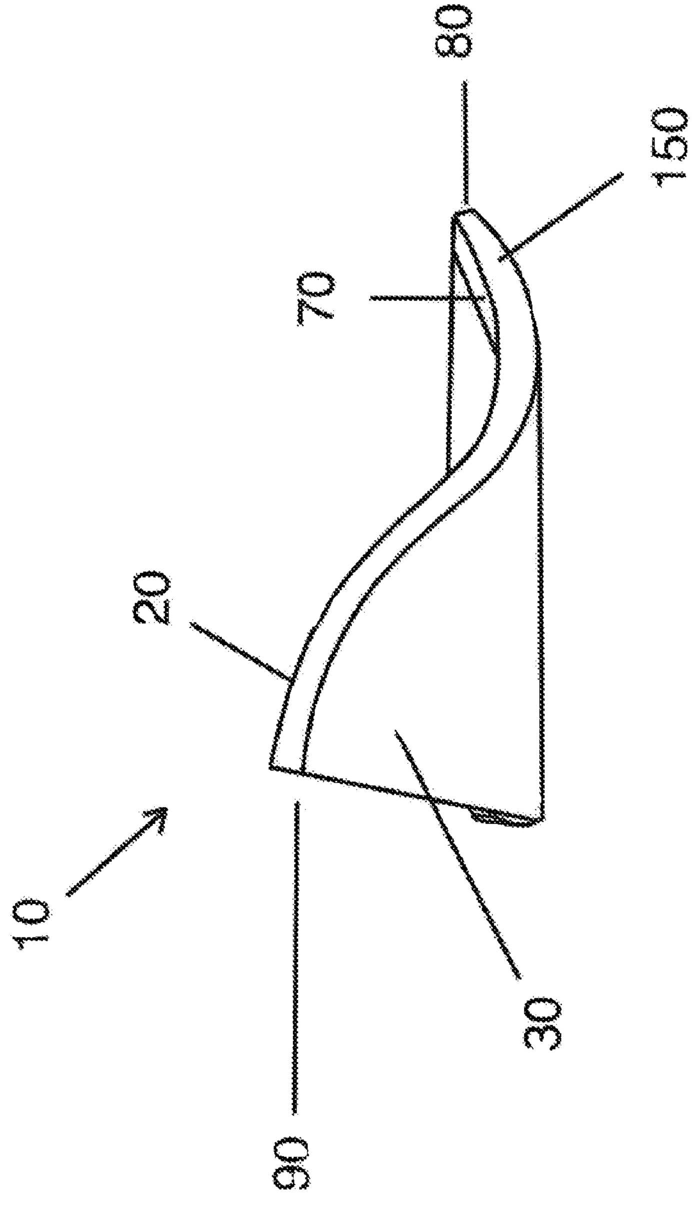
FIG. 6 is a section view illustration of an embodiment of the Ergonomic Handle Scraper.
Figure 7:
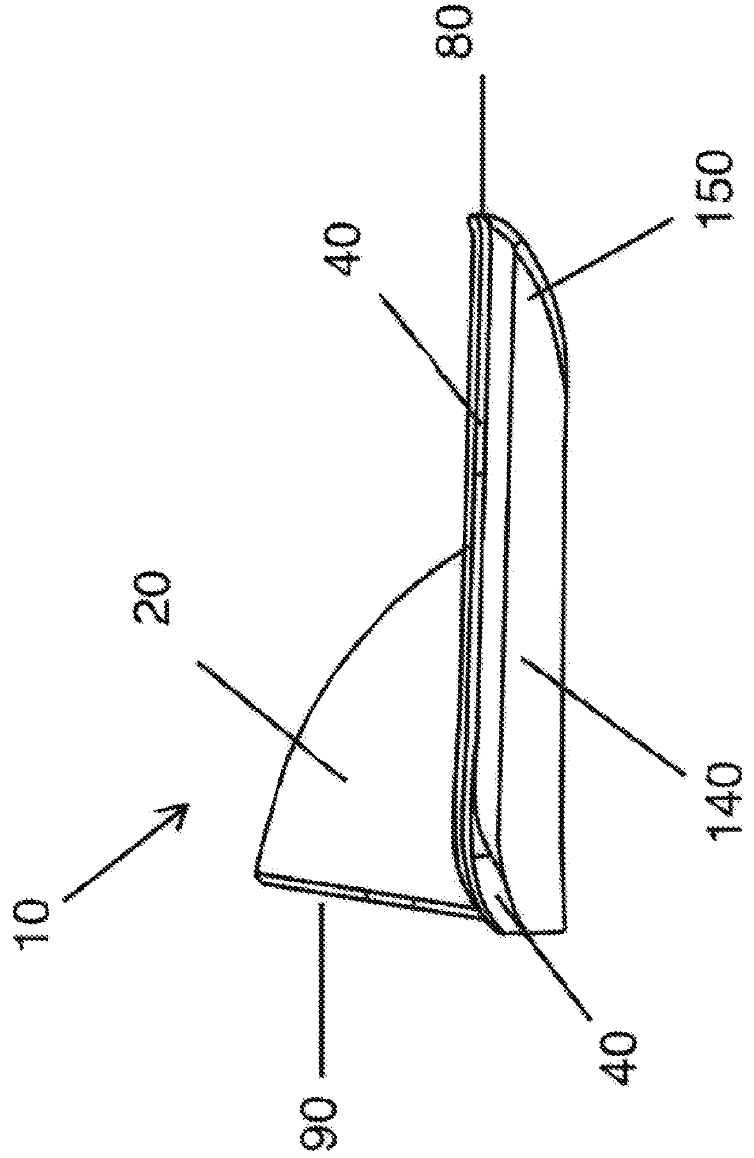
FIG. 7 is a side view illustration of an embodiment of the Ergonomic Handle Scraper.
Figure 8:
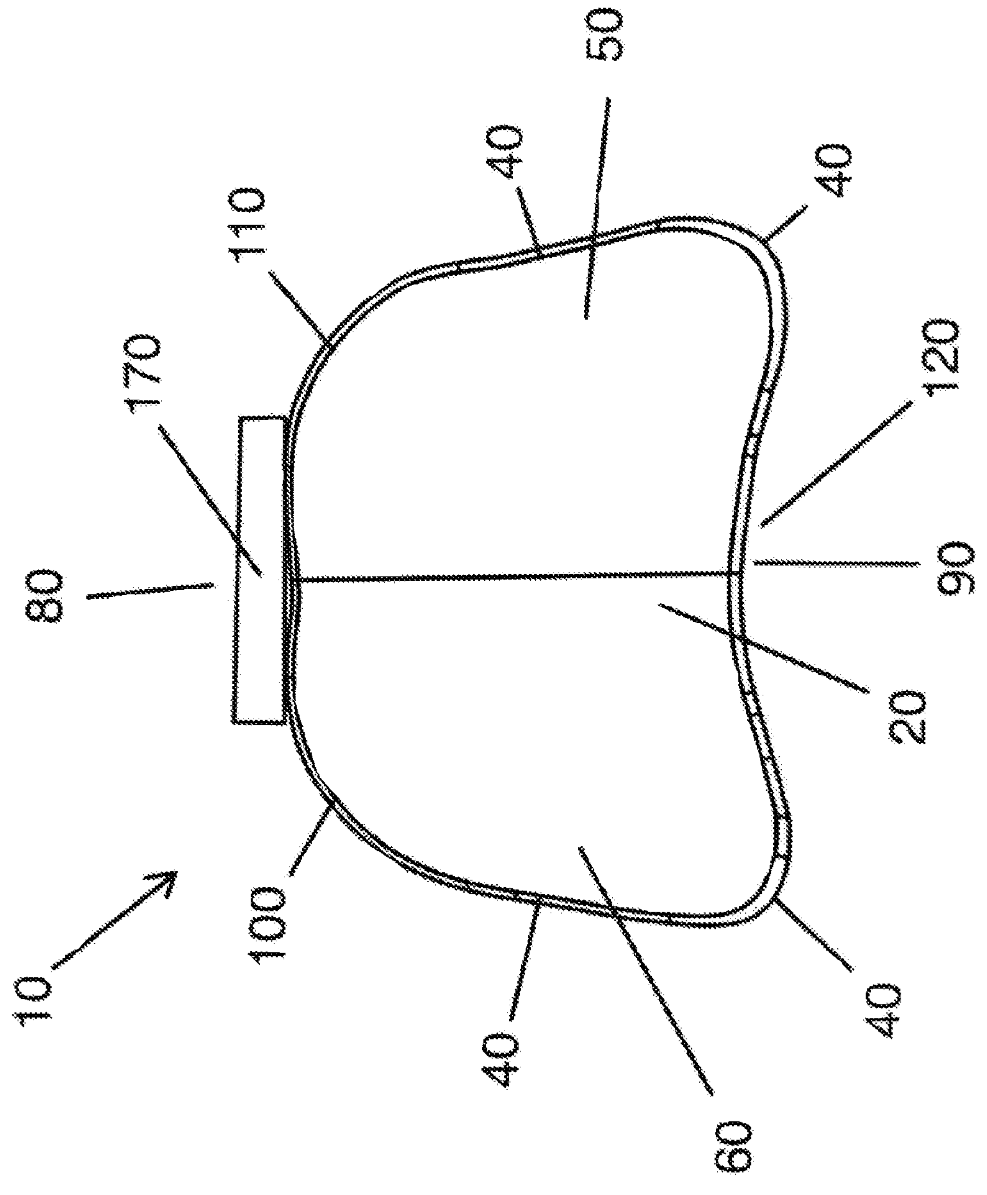
FIG. 8 is a top view illustration of an embodiment of the Ergonomic Handle Scraper with a razor attachment.
Figure 9:
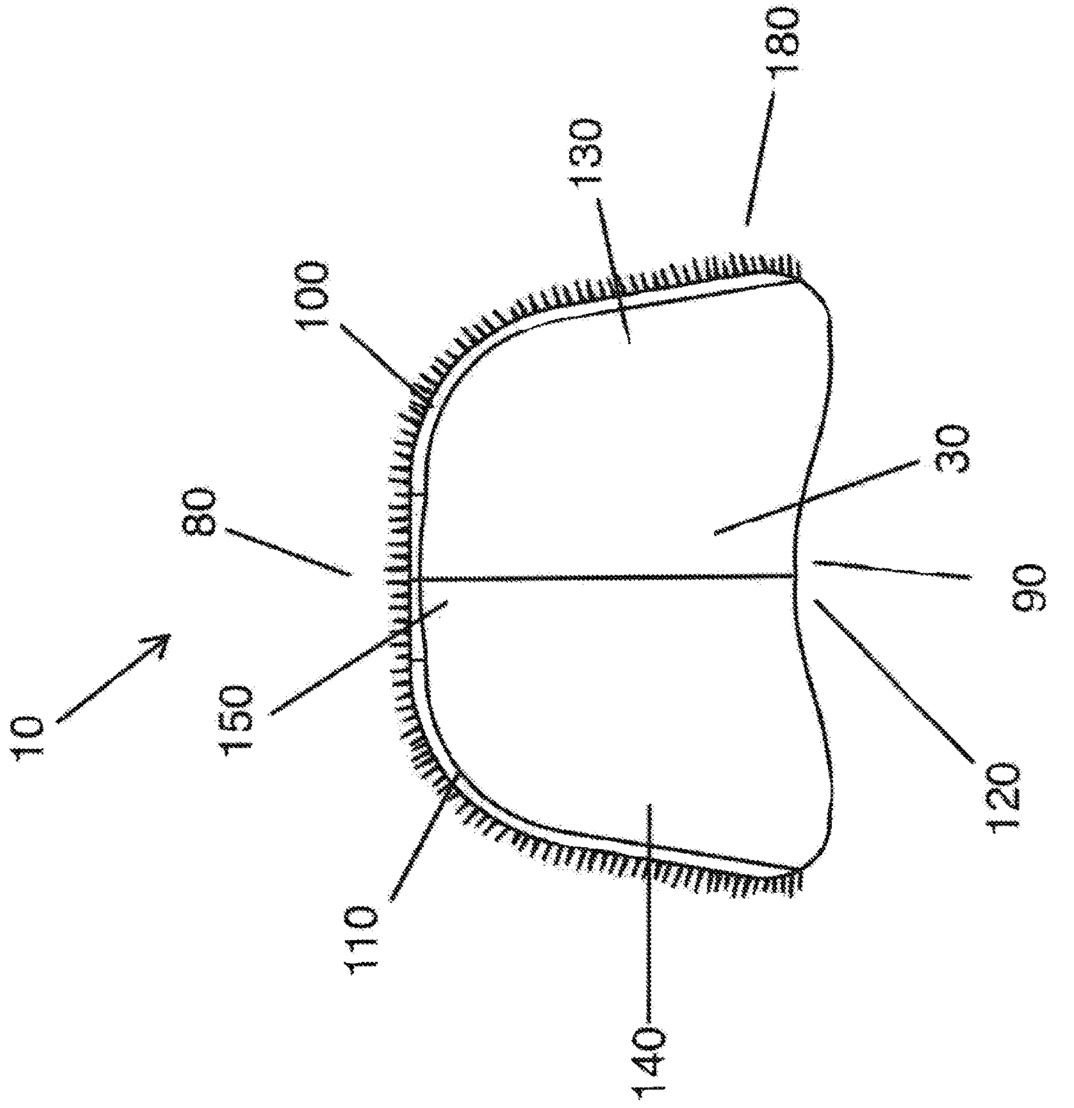
FIG. 9 is an underside view illustration of an embodiment of the Ergonomic Handle Scraper with various bristle attachments.
Figure 10:
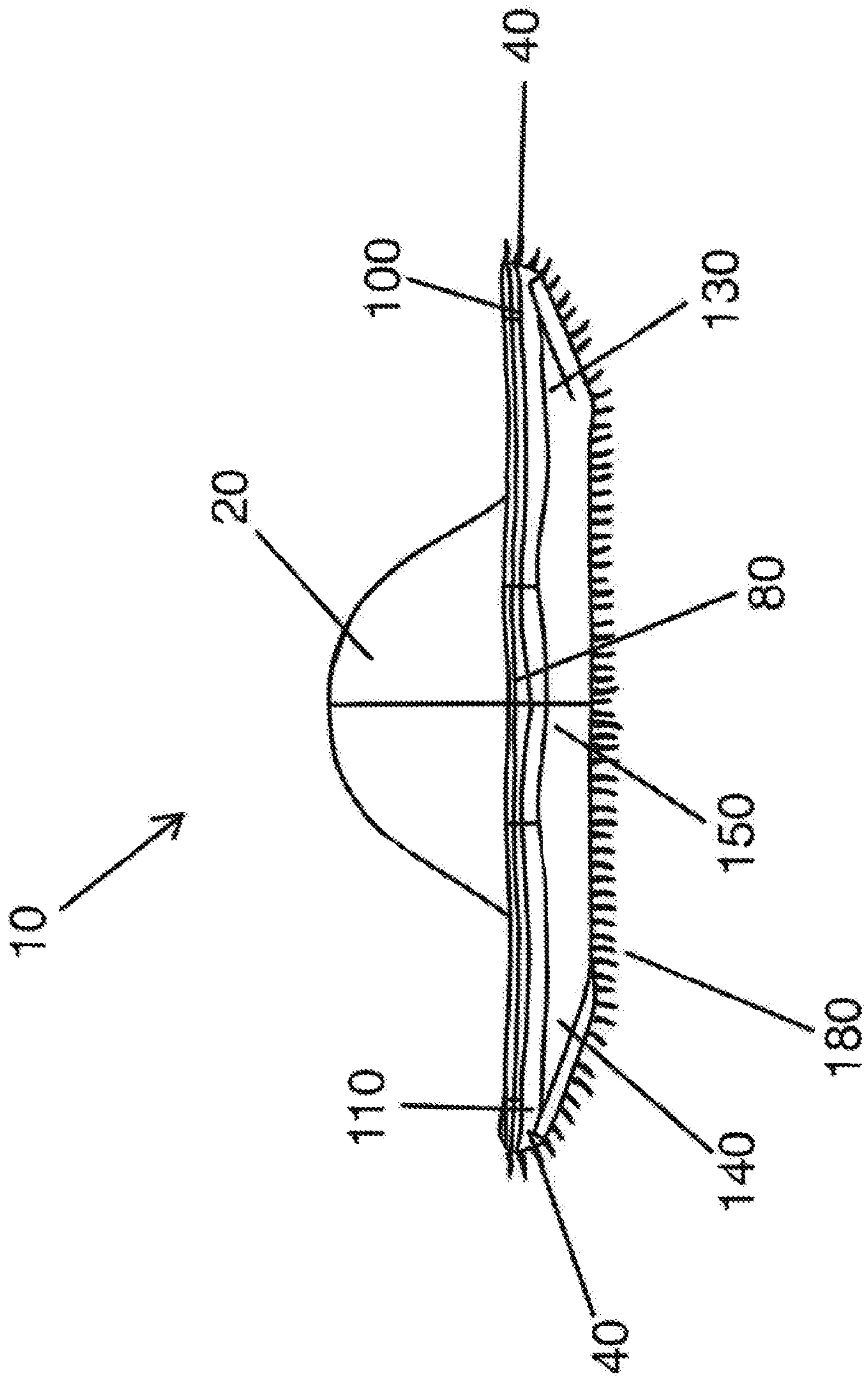
FIG. 10 is a front view illustration of an embodiment of the Ergonomic Handle Scraper with various bristle attachments.
Figure 11:
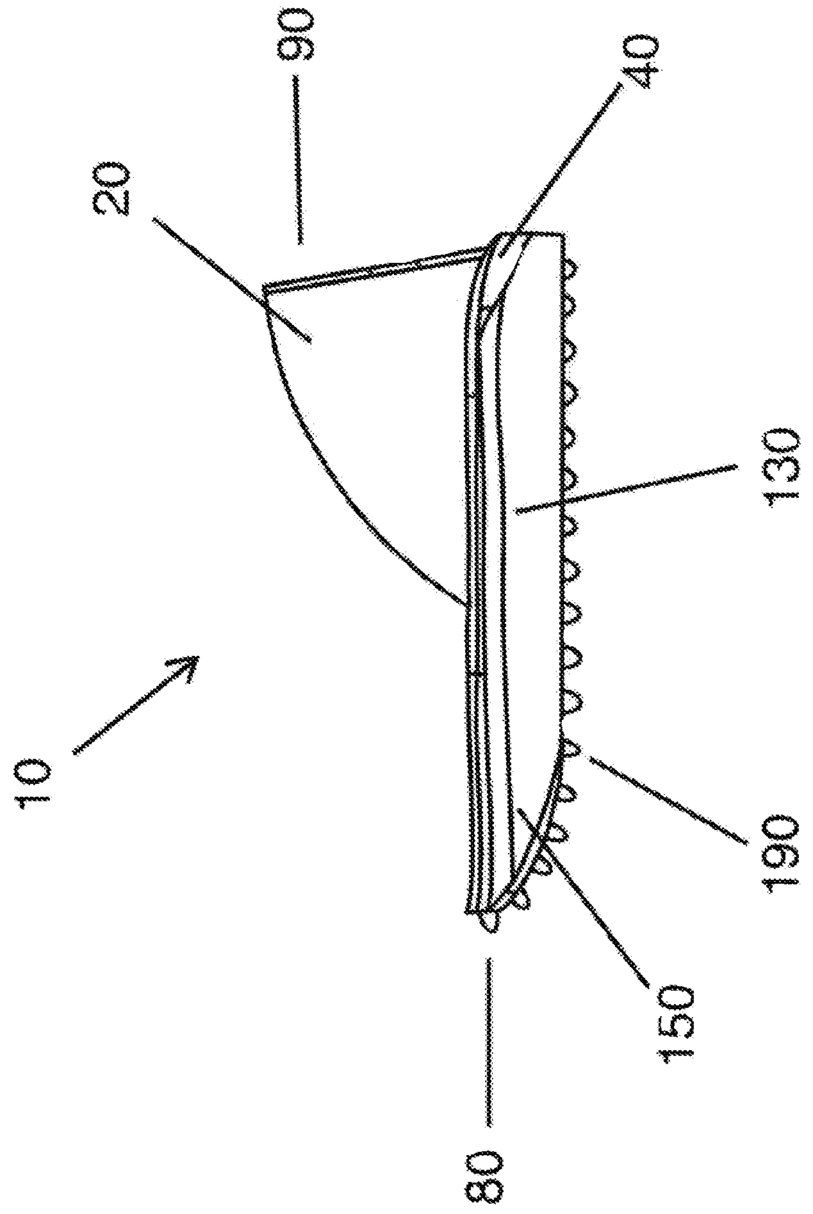
FIG. 11 is a side view illustration of an embodiment of the Ergonomic Handle Scraper with various abrasive textures.
Figure 12:
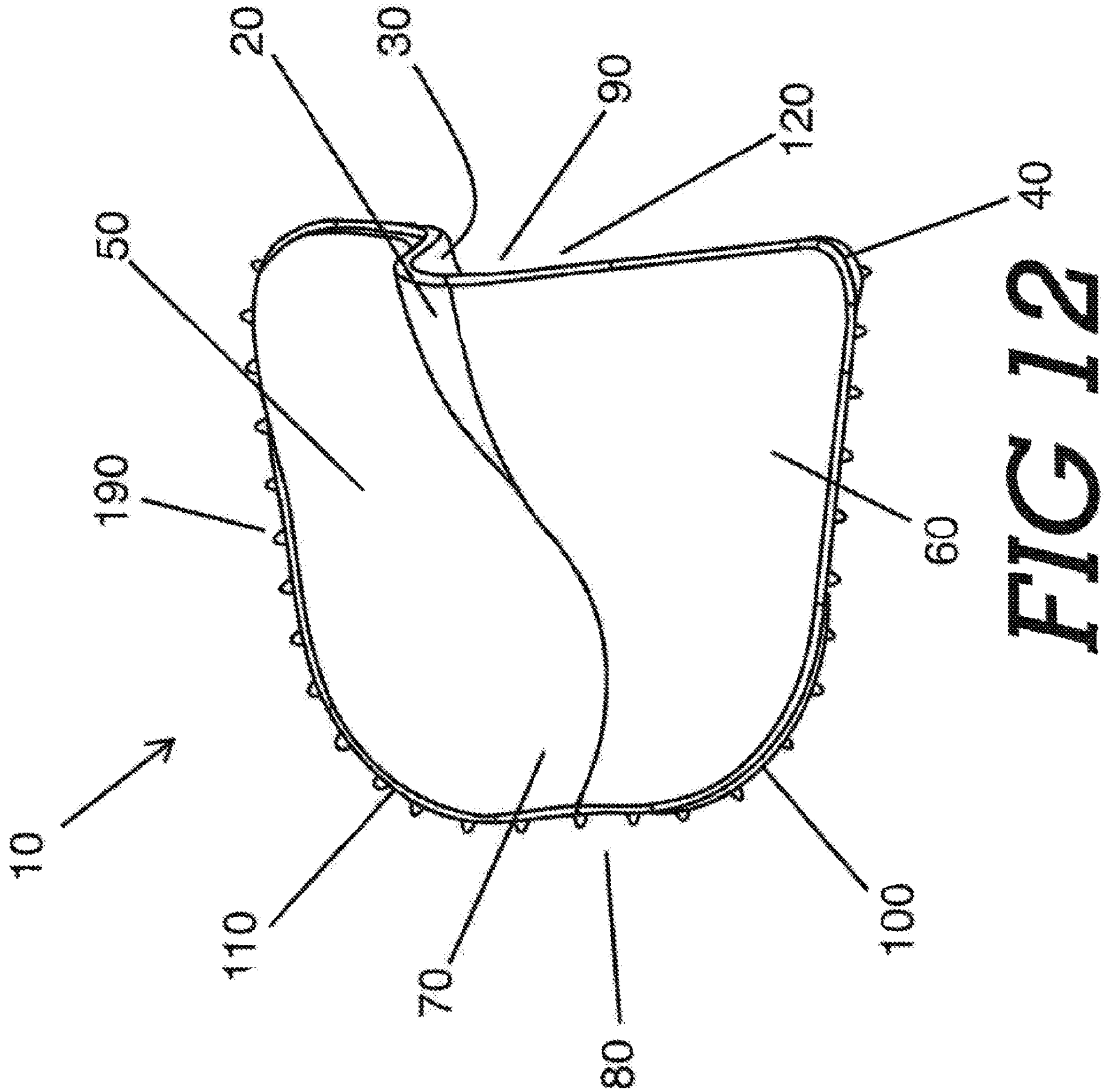
FIG. 12 is a top view illustration of an embodiment of the Ergonomic Handle Scraper with various abrasive textures.
Figure 13:
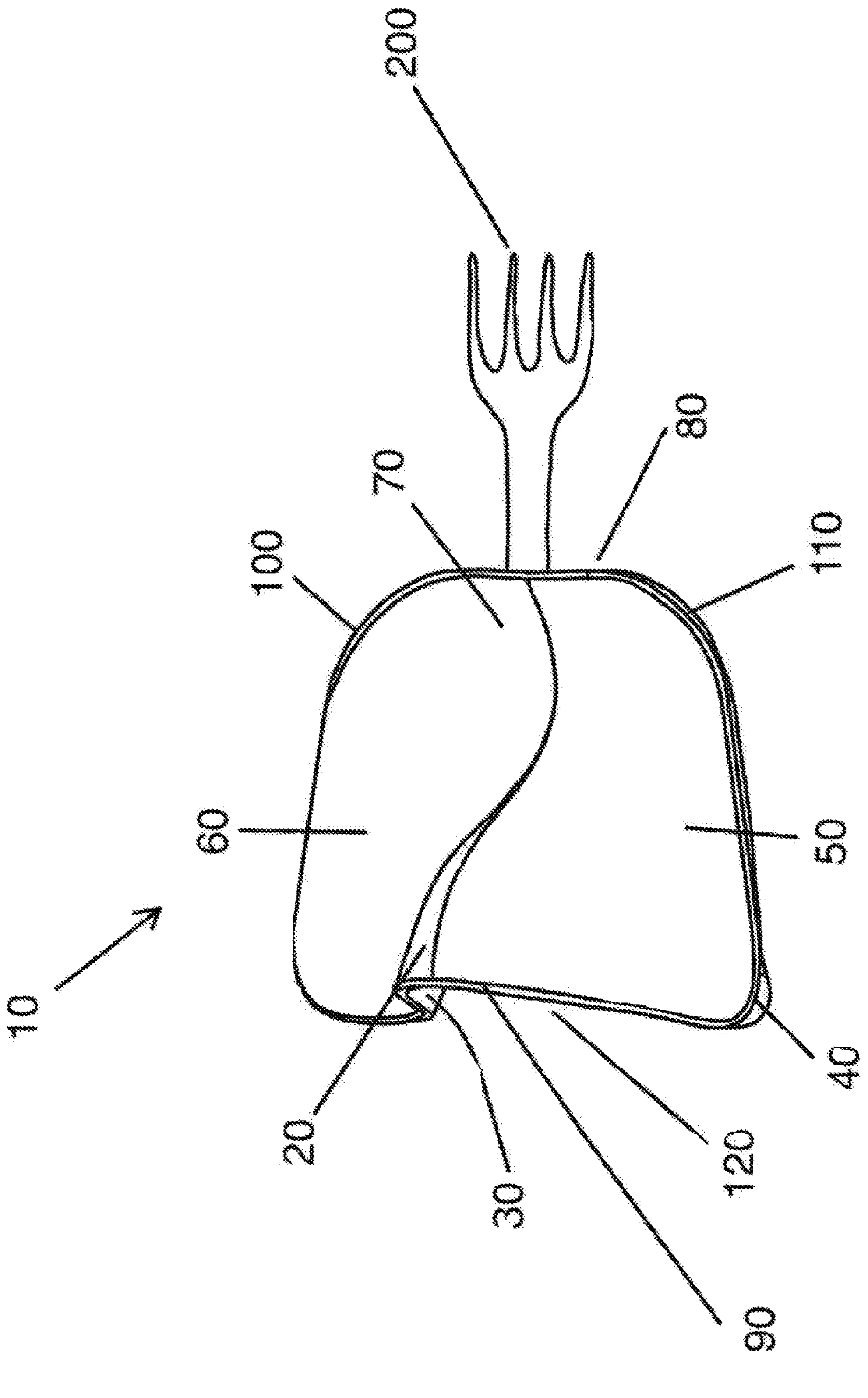
FIG. 13 is a top view illustration of an embodiment of the Ergonomic Handle Scraper with a fork attachment.
Figure 14:
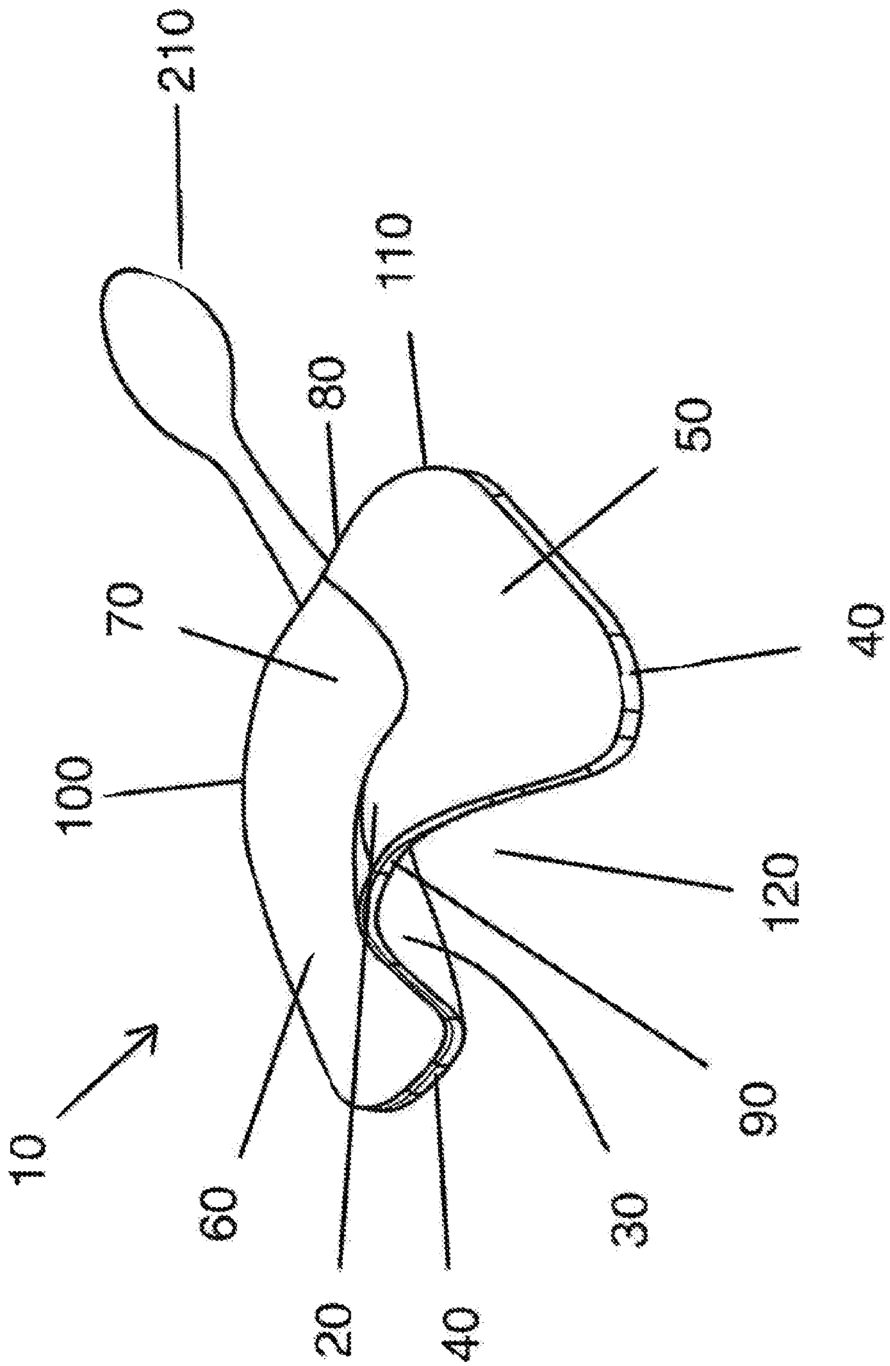
FIG. 14 is a top view illustration of an embodiment of the Ergonomic Handle Scraper with a spoon attachment.
Figure 15:
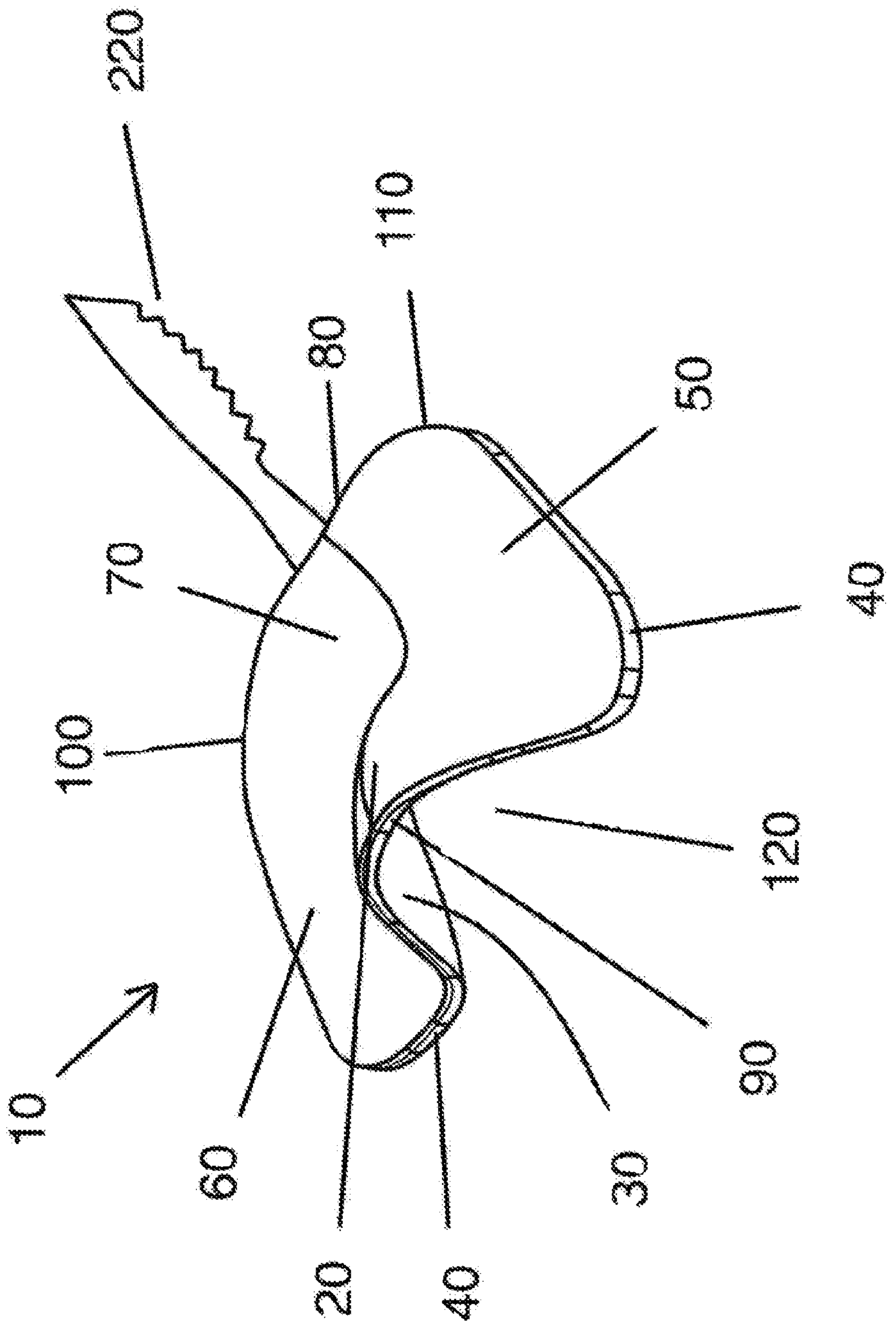
FIG. 15 is a top view illustration of an embodiment of the Ergonomic Handle Scraper with a knife attachment.
Figure 16:
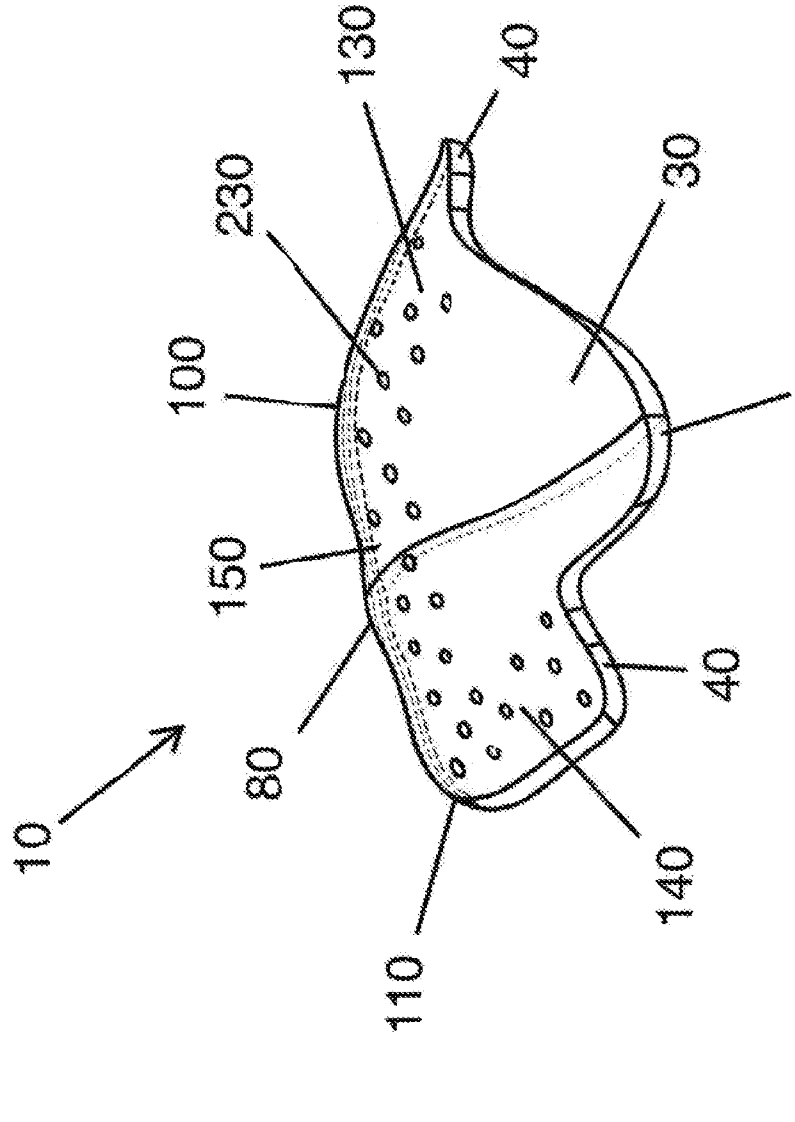
FIG. 16 is an underside view illustration of an embodiment of the Ergonomic Handle Scraper with a perforated surface for grating.
Figure 17:
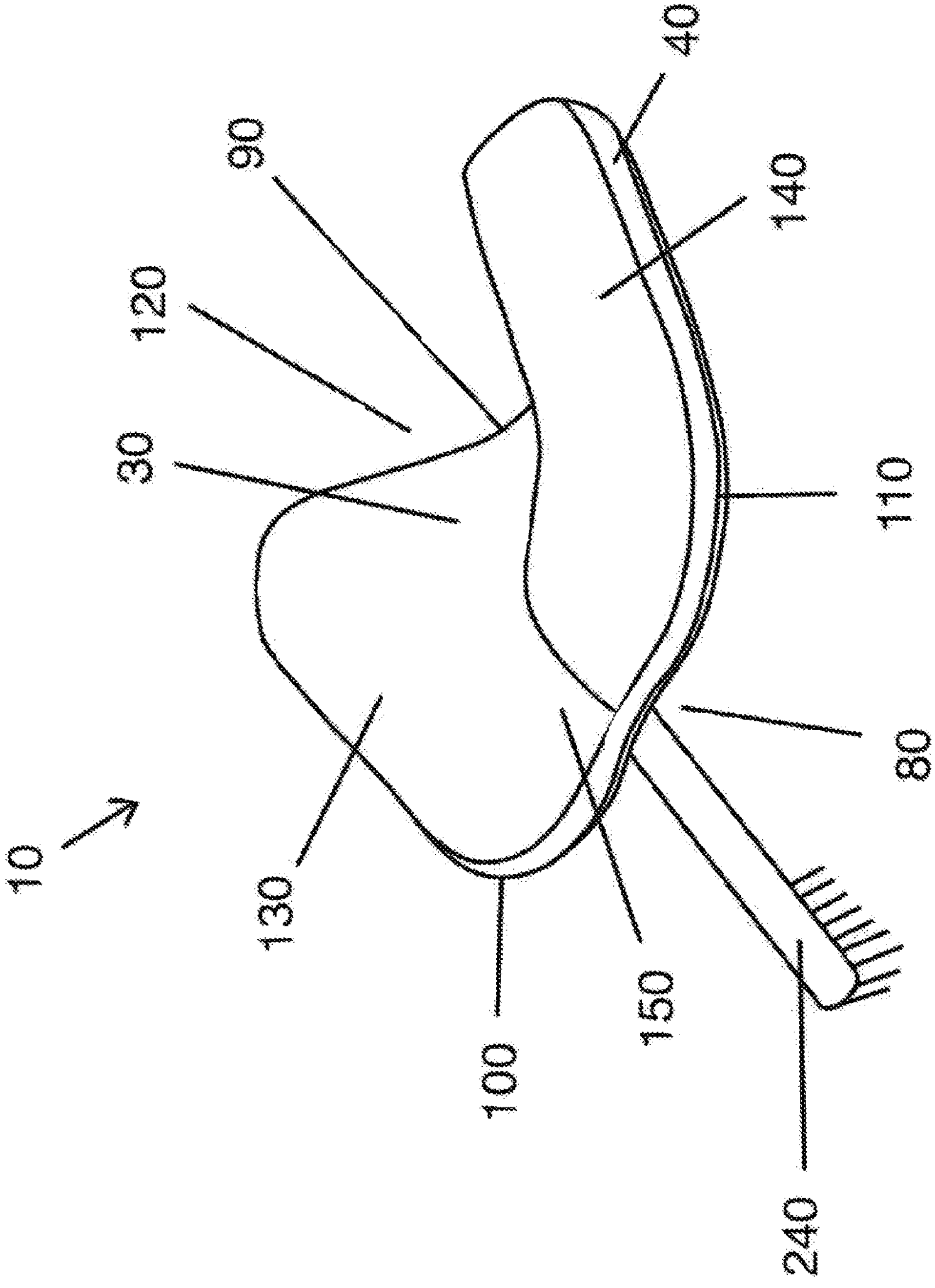
FIG. 17 is an underside view illustration of an embodiment of the Ergonomic Handle Scraper with a toothbrush attachment.
Figure 18:
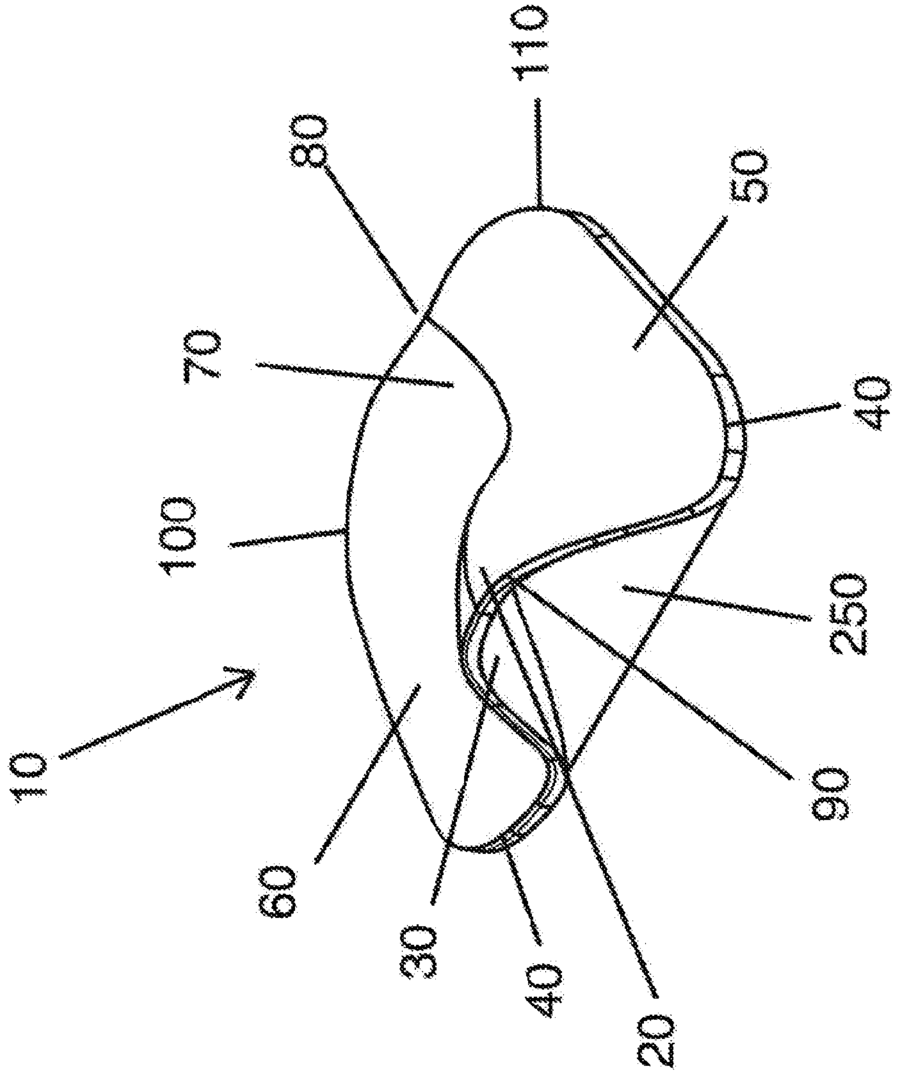
FIG. 18 is a topside view illustration of an embodiment of the Ergonomic Handle Scraper with an underside protective surface.
Figure 19:
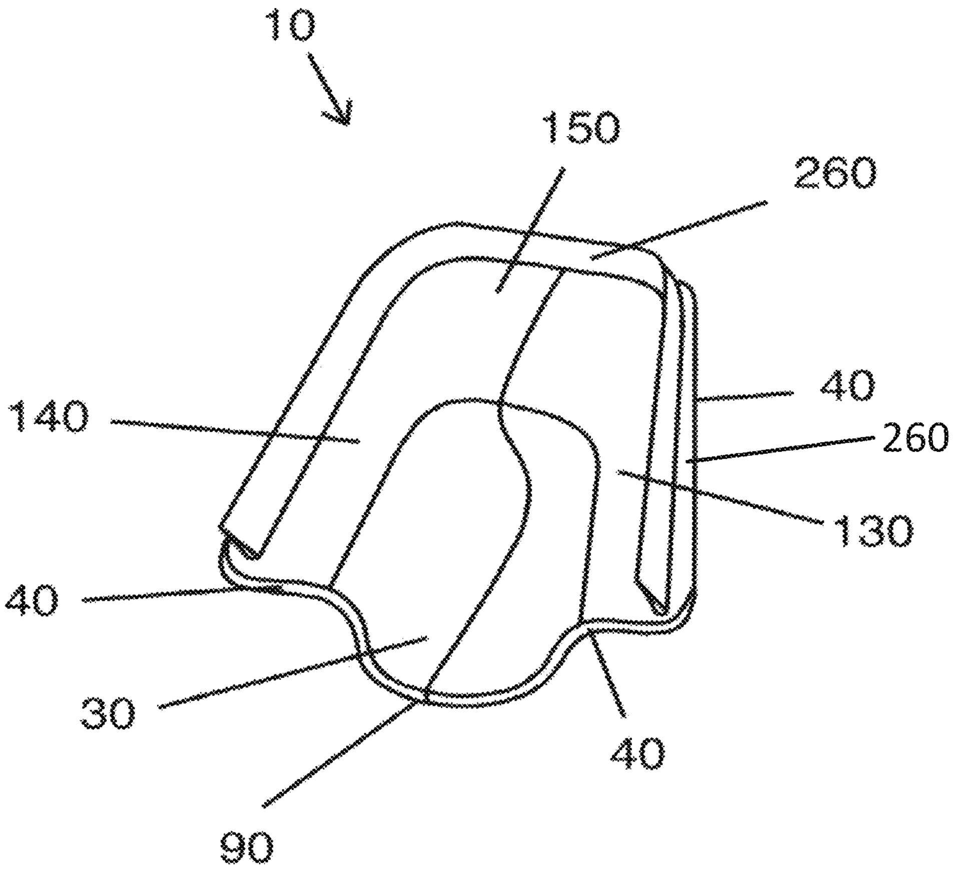
FIG. 19 is an underside view illustration of an embodiment of the Ergonomic Handle Scraper configured as a squeegee with a straight rear edge.

The Ergonomic Handle Scraper 10 is comprise of a topside convex surface 20, underside concave surface 30, perimeter edge surface 40, right topside surface 50, left topside surface 60, front topside surface 70, front end 80, gripping end 90, cavity 120, left underside surface 130, right underside surface 140, front underside surface 150, that can be gripped by user's hand, thumb or digit(s) 160. One embodiment of the Ergonomic Handle Scraper 10 comprises a front left corner 100 and a front right corner 110. The edge perimeter surface 40 may form a variety of shapes and contours. The topside right surface 50, topside left surface 60, topside front surface 70, underside left surface 130, underside right surface 140, underside front surface 150, may be flat, angular, geometric or curved. FIGS. 1 through 19 depict a preferred embodiment of the Ergonomic Handle Scraper 10. Referring to the above-identified figures, a human hand, thumb or digits 160 is shown with the Ergonomic Handle Scraper 10 applied as depicted. It is understood that the Ergonomic Handle Scraper 10 may be held by user's hand, thumb or digit(s) 160. The Ergonomic Handle Scraper 10 can be equivalently described as comprising a saddle. The Ergonomic Handle Scraper 10 can also have an aperture 270 through which a hook or nail can be placed to hang the Ergonomic Handle Scraper 10.

The topside convex surface 20 and underside concave surface 30 may be constructed to form more smooth, gradual curved surfaces. The topside convex surface 20 and underside concave surface 30 may also be constructed to form more arched, angular or vaulted surfaces.

Although it is understood that the Ergonomic Handle Scraper 10 may be grasped at various points throughout the Ergonomic Handle Scraper 10, it is generally intended that the user's hand, thumb or digit(s) 160 will grasp the Ergonomic Handle Scraper 10 on the gripping end 90. The user's hand, thumb or other digit(s) 160 may occupy the underside cavity 120. The underside cavity 120 and underside concave surface 30 provides a place to comfortably position a user's hand, thumb or digits 160. The cavity 120 is designed to protect the user's hand, thumb or digit(s) 160 and prevent the user's hand, thumb or digit(s) 160 from interfering with the activity that is being performed.

Figure 20:
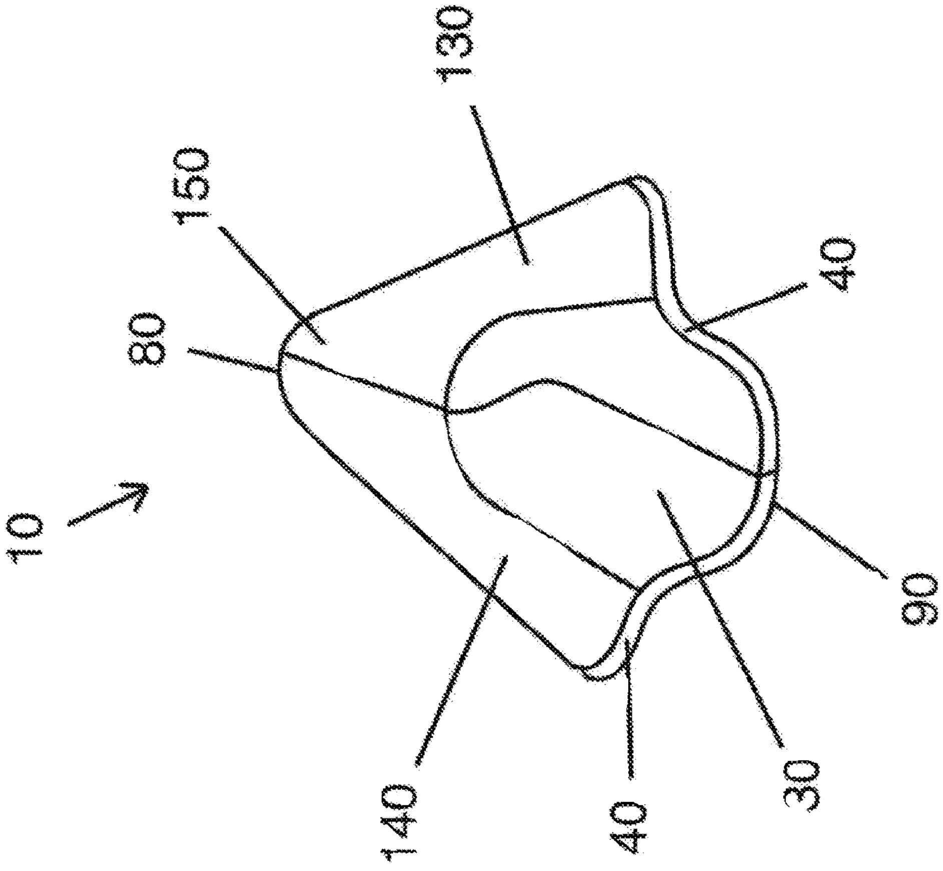
FIG. 20 is an underside view illustration of an embodiment of the Ergonomic Handle Scraper demonstrating a pointed front end with a flat underside front surface, flat underside left surface and flat underside right surface.

The perimeter edge surface 40 may be constructed to form a variety of overall product shapes. The perimeter edge surface 40 may be constructed to form a front left corner 100 and front right corner 110. However, in other embodiments the perimeter edge surface 40 does not form a front left or front right corner. See FIG. 20. The perimeter edge surface 40 can also incorporate a blade or cutting edge into the edge perimeter surface 40. In some cases, the front left corner 100 and front right corner 110 may not be necessary. The perimeter edge surface 40 generally meets the underside concave surface 30 at the greatest depth of the concave surface 30.

The Ergonomic Handle Scraper 10 may be adapted to accomplish different tasks necessary for daily life. The Ergonomic Handle Scraper 10 may be adapted to function as a shaving razor. A razor 170 or other devices necessary for daily life may be attached to the Ergonomic Handle Scraper 10. The Ergonomic Handle Scraper 10 may be adapted to comprise a paintbrush, bristle brushes, foam brushes, hairbrush or comb. Various bristles 180 may be attached to the Ergonomic Handle Scraper 10. The Ergonomic Handle Scraper 10 may be adapted to function as an eating utensil. A fork 200, spoon 210 or knife 220 attachments may be attached to the Ergonomic Handle Scraper 10. The Ergonomic Handle Scraper 10 may be adapted to function as a toothbrush. A toothbrush 240 may be attached to the Ergonomic Handle Scraper 10.

The Ergonomic Handle Scraper 10 may be adapted to function as a scrubbing or sanding device. Various bumps or other textures may be added to the Ergonomic Handle Scraper 10. The abrasive textures 190 may be included on the left underside surface 130, right underside surface 140, front underside surface 150, as well as the edge perimeter surface 40. Textures or other surface adaptations may be applied on the topside of the device or may be applied anywhere on the Ergonomic Handle Scraper 10.

The Ergonomic Handle Scraper 10 may be adapted to function as a grating device, such as a cheese grater or lemon zester. Various perforations or holes 230 may be included on the left underside surface 130, right underside surface 140, front underside surface 150.

An underside protective surface 250 may adjoin the left underside surface 130, the right underside surface 140 and front underside surface 150. Further, the underside protective surface 250 may partially enclose the cavity 120. The underside protective surface 250 may serve as a barrier that protects the user's hand, thumb or digit(s) 160 while the device is contacting another surface.

A one or both of a squeegee blade or additional scraping surface 260 may be attached at various points throughout the device. In particular, a squeegee blade or scraping surface 260 may be attached to the left underside surface 130, right underside surface 140 and front underside surface 150. The squeegee or additional scraping surface 260 may also be attached anywhere along the edge perimeter surface 40 or topside of the device.

Figure 21:
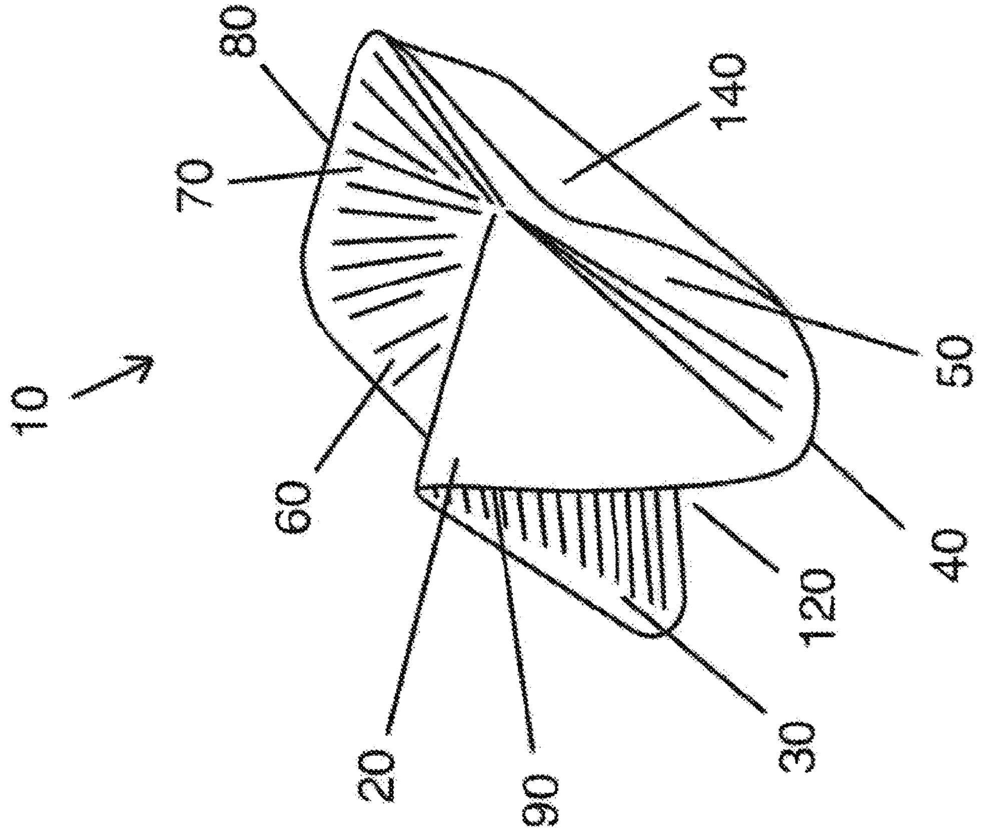
FIG. 21 is a topside view illustration of an embodiment of the Ergonomic Handle Scraper configured as a personal hygiene wipe.
Figure 22:
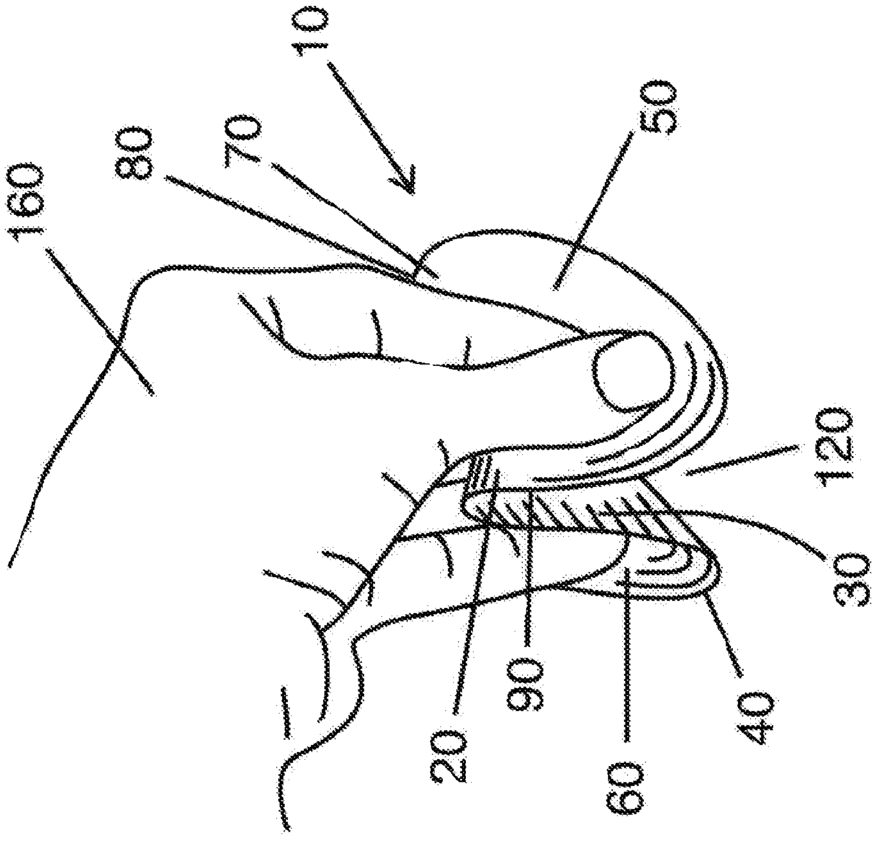
FIG. 22 is a topside view illustration of an embodiment of the Ergonomic Handle Scraper configured as a personal hygiene wipe.
Figure 23:
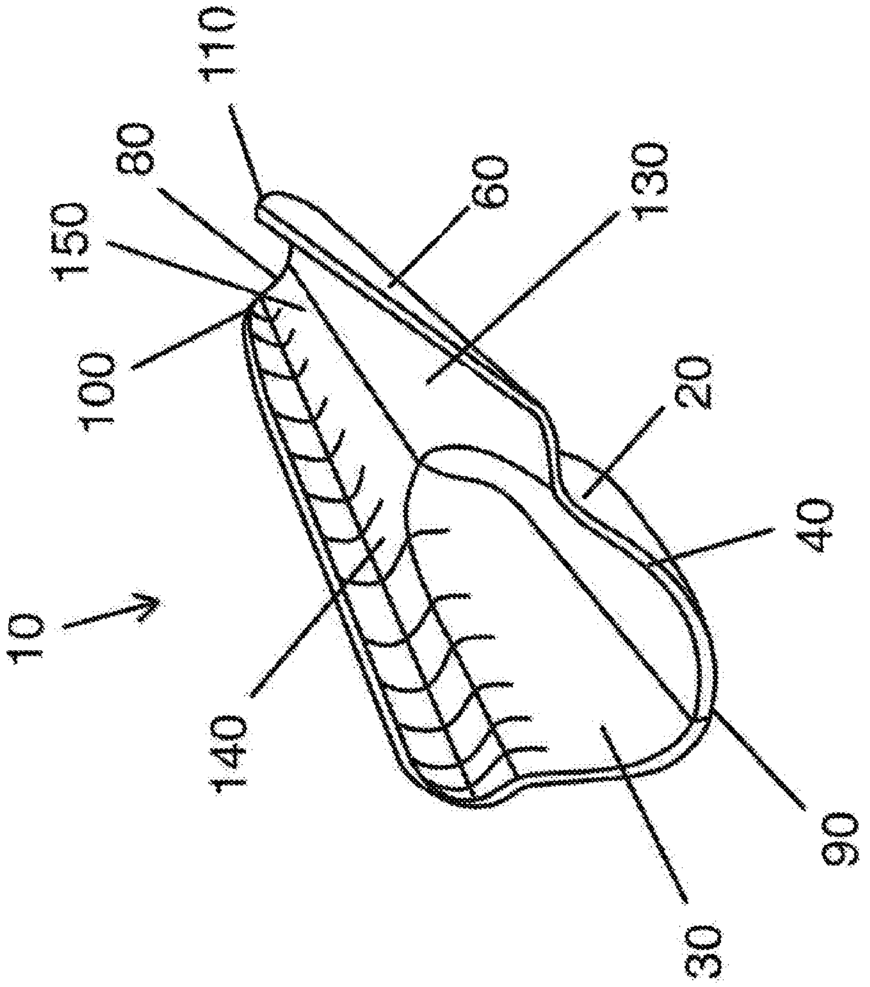
FIG. 23 is an underside view illustration of an embodiment of the Ergonomic Handle Scraper demonstrating a curved underside front surface as curved.
Figure 24:
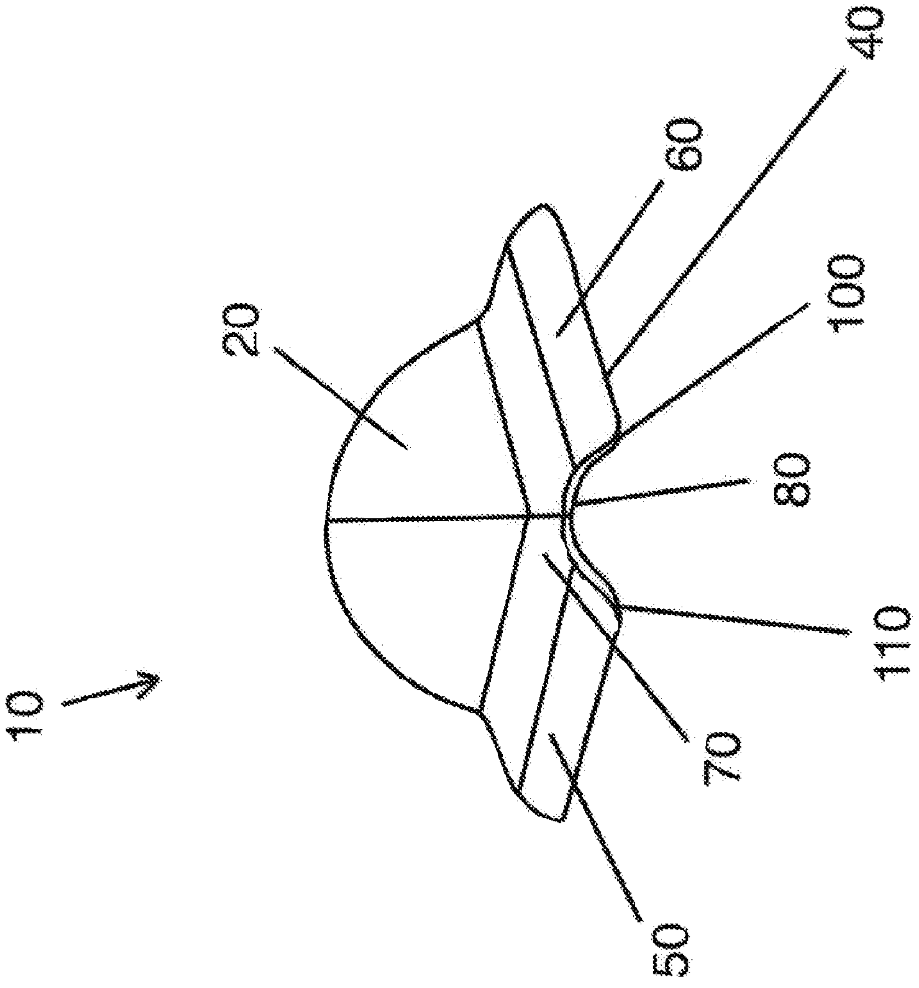
FIG. 24 is a front view illustration of an embodiment of the Ergonomic Handle Scraper demonstrating a curved underside front surface as curved.
Figure 25:
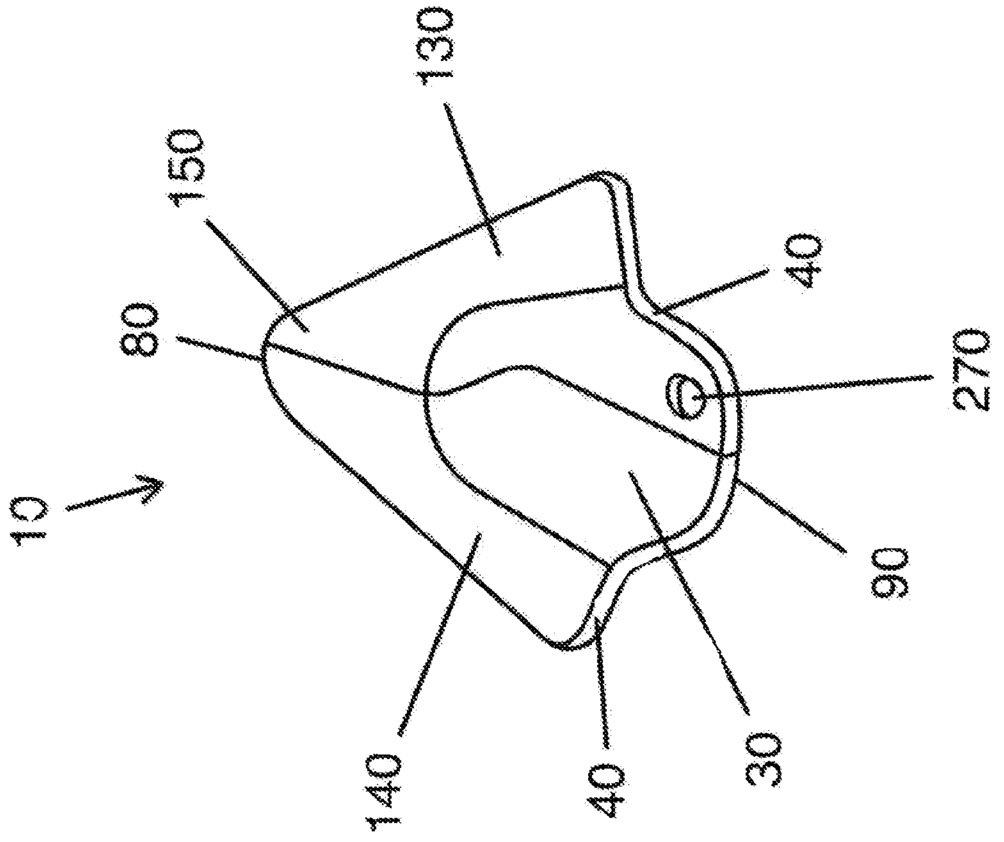
FIG. 25 is an underside view illustration of an embodiment of the Ergonomic Handle Scraper demonstrating a pointed front end with a flat underside front surface, flat underside left surface, a flat underside right surface, and an aperture.

In another embodiment, Ergonomic Handle Scraper 10 is manufactured from single ply or multiple ply paper. See FIGS. 21 and 22. This permits the Ergonomic Handle Scraper 10 to be used as a personal hygiene wipe and as a replacement for personal wipes and toilet paper. In addition, in this embodiment, the Ergonomic Handle Scraper 10 can be treated or impregnated with medicines, ointments, salves, and creams to treat rashes and other medical conditions.

In another embodiment, a pen, pencil, or other similar writing instrument may be attached to the Ergonomic Handle Scraper 10 to provide a comfortable means to use such writing instrument.

Referring to the illustrations, pictures and drawings, where like elements are generally identified with like numerals throughout, in various embodiments. The Ergonomic Handle Scraper 10 may be of many dimensions, shapes and sizes and the drawings should not be considered to limit the Ergonomic Handle Scraper 10 to just the drawings. It is understood that although the illustrations and detailed description refer to the various embodiments generally as an Ergonomic Handle Scraper 10, the various embodiments should not be limited by these terms. It is contemplated that the current Ergonomic Handle Scraper may have numerous applications and utilities where it is desired to generally provide a compact ergonomic handle device. The Ergonomic Handle Scraper 10 can be used conjunction to many other products to aid in the holding of these added products in addition to it's own singular uses.

The Ergonomic Handle Scraper is not limited to scrubbing or cleaning purposes and may be utilized on other types of materials or surfaces for other tasks and procedures such as but not limited to scrubbing, cleaning, painting, shaving among many other things.

What is claimed is:

1. An ergonomic handle scraper comprising
a topside convex surface,
an underside concave surface,
a perimeter edge surface,
a right topside surface,
a left topside surface,
a front topside surface,
a front end,
a gripping end,
a saddle,
a left underside surface,
a right underside surface,
a front underside surface,
one or both of a squeegee blade or an additional scraping surface attached at various points throughout the device, and
the squeegee blade or the additional scraping surface attached to one of the left underside surface, right underside surface, or the front underside surface,
wherein a raised portion of the saddle commences at an approximate center of the saddle and extends along a longitudinal axis to the edge of the saddle to the gripping end where the deepest portion of the saddle intersects the perimeter edge surface at the gripping end,
wherein the deepest portion of the saddle intersects the perimeter edge surface at the gripping end protects a user's hand, thumb, or digits by preventing the user's hand, thumb or digits from interfering with a surface on which an activity is being performed, and
wherein optional textures or other surface adaptations may be applied on the topside of the device or may be applied anywhere on the ergonomic handle scraper.

2. The ergonomic handle scraper described in claim 1 comprising the squeegee or the additional scraping surface attached anywhere along the edge perimeter surface, a right topside surface, a left topside surface, a front topside surface, or the edge perimeter surface of all three topside surfaces.

* * * * *